No. 668,782. Patented Feb. 26, 1901.
C. E. TORRANCE.
FILTER.
(Application filed June 27, 1900.)
(No Model.)

WITNESSES:
INVENTOR:
Chas. E. Torrance

THE NORRIS PETERS CO., PHOTO-LITHO., WASHINGTON, D. C.

UNITED STATES PATENT OFFICE.

CHARLES E. TORRANCE, OF NORTHAMPTON, MASSACHUSETTS.

FILTER.

SPECIFICATION forming part of Letters Patent No. 668,782, dated February 26, 1901.

Application filed June 27, 1900. Serial No. 21,757. (No model.)

*To all whom it may concern:*

Be it known that I, CHARLES E. TORRANCE, of Northampton, in the county of Hampshire and State of Massachusetts, have invented certain new and useful Improvements in Filters, of which the following is a specification.

This invention relates to apparatus for filtering water and other liquids in large quantities, in which the liquid is passed through filtering beds or tanks filled with filtering material, such as sand, the liquid being admitted to the top of the bed and allowed to percolate through it and flow out through a pipe near the bottom, this pipe being provided with numerous lateral pipes to which are attached strainers with fine openings, which prevent the filtering material from flowing out with the filtered liquid. After a period of operation of the filter, the length of which varies with the quality of the liquid, the sediment separated from the liquid clogs the top of the bed and prevents the flow of the filtered liquid, so that it becomes necessary to force a reverse current upwardly through the bed, when the sediment, which is lighter than the filtering material, separates from the latter and flows off.

The invention has for its object to provide improved means for controlling the direction of the flow of liquid through the bed, so that the filtered liquid that has passed downwardly through the bed and the wash-supply which is to pass upwardly through the bed may flow through the same passage.

The invention consists in the improvements which I will now proceed to describe and claim.

Figure 1:
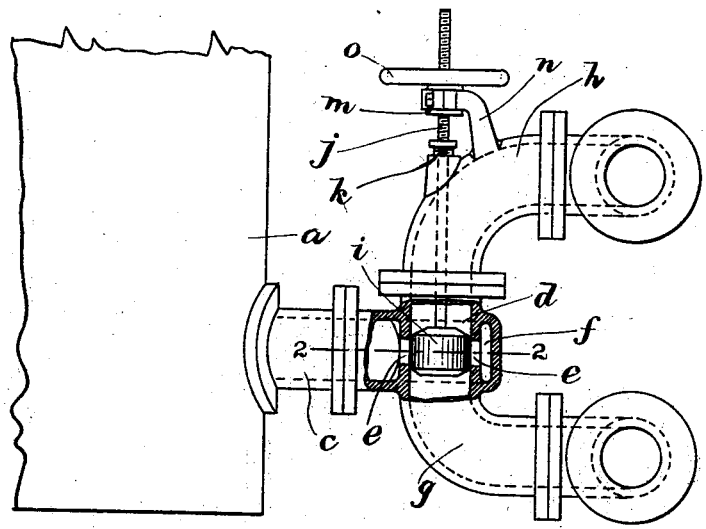
Figure 2:
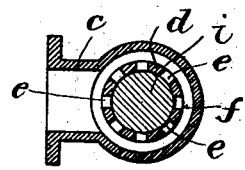
Figure 3:
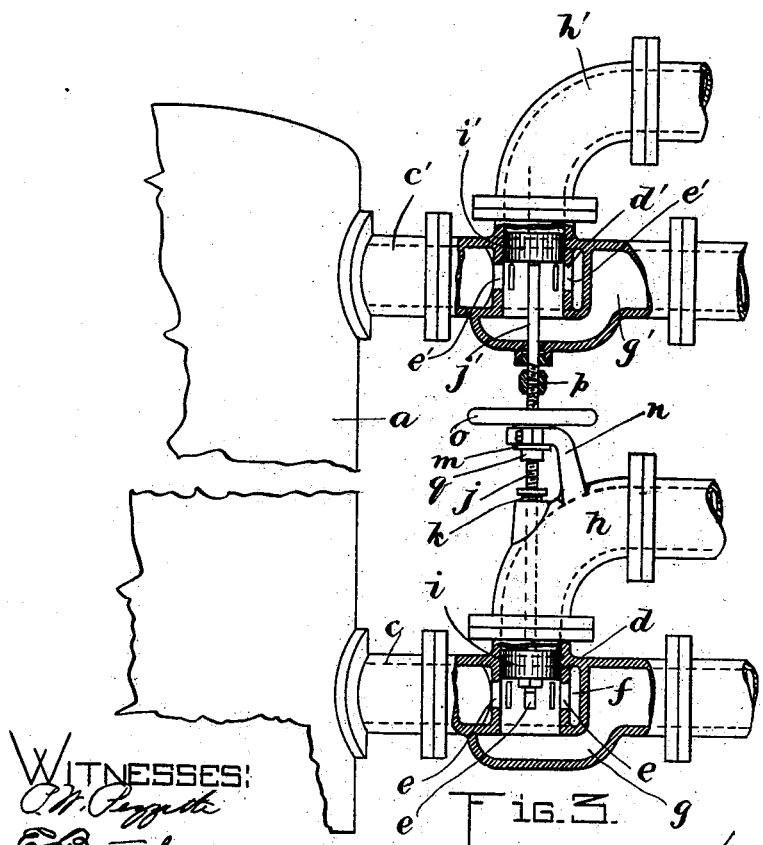

Of the accompanying drawings, forming a part of this specification, Figure 1 represents a side elevation, partly in section, of a filter-bed tank or holder embodying my invention. Fig. 2 represents a section on the line 2 2 of Fig. 1. Fig. 3 represents a similar view showing a somewhat different embodiment of the invention.

The same reference characters indicate like parts or features in all the drawings wherever they occur.

On the drawings, $a$ represents a filter-bed tank or holder containing a body of sand or other suitable filtering material which constitutes the filter-bed. The unfiltered liquid is admitted to the tank above the filter-bed by a suitable supply apparatus and percolates downward through the bed.

$c$ represents a conduit which communicates with the lower portion of the filter-bed and extends outwardly through the tank, the said conduit having suitable provisions within the tank for preventing the escape of the filtering material through the conduit.

$d$ represents a chamber which has a cylindrical bore or interior extending across the conduit $c$ and communicating with the latter through a series of ports $e$, formed in the wall of the chamber $d$ between the end portions thereof and an annular passage $f$, which nearly surrounds the portion of the chamber $d$ in which the ports $e$ are formed and communicates with the conduit $c$, as clearly shown in Fig. 2.

$g$ represents a conduit for filtered liquid, the same constituting an extension of the lower end of the chamber $d$ and being internally of the same capacity as the interior of the said chamber, the conduit $g$ communicating through suitable connections with a reservoir for the filtered water.

$h$ represents a conduit for the wash-supply used to clean the filter-bed, the said conduit constituting an extension of the upper end of the chamber $d$ and communicating through suitable connections with a source of supply of wash liquid, which may be the reservoir for the filtered water that passes through the conduit $g$. The interior of the conduit $h$ is of practically the same capacity as the interior of the chamber $d$. The chamber $d$ and the conduits $g$ and $h$ therefore constitute a continuous conduit of practically uniform capacity, the portion of the chamber $d$ below the ports $e$ serving, with the conduit $g$, to conduct the filtered water away from the conduit $c$ and from the filter-bed, while the portion of the chamber $d$ above the ports $e$, together with the conduit $h$, serves to conduct the wash-supply to the conduit $c$ and to the filter-bed.

$i$ represents a cylindrical valve which closely fits the interior of the chamber $d$ and is movable vertically therein. The form of the valve $i$ is such that it is adapted to produce three results, namely: First, when the valve is adjusted to a position above the ports $e$ it shuts off the conduit $h$ from the conduit $c$, thus permitting the filtered water to flow through the conduit $g$; second, when the valve is adjusted to a position below the ports $e$ it shuts off the conduit $g$ from the conduit $c$ and permits the wash-supply to flow through the conduit $h$ and the upper portion of the chamber $d$ back into the conduit $c$, and, third, when the valve is adjusted to an intermediate position it closes the ports $e$, thus preventing the flow of liquid in either direction through the conduit $c$.

The valve $i$ may be adjusted to the different positions above described and positively held in either of said positions by any suitable adjusting mechanism. I have here shown the valve provided with a stem $j$, which passes through a stuffing-box $k$, supported by the conduit $h$, the upper portion of said stem being screw-threaded and engaged with a nut $m$, which is journaled to rotate in an arm or bracket $n$ affixed to the conduit $h$, the nut being provided with a hand-wheel $o$, by means of which it may be rotated to raise or lower the valve $i$. It will be seen that when the valve is at either extreme of its adjustment a free passage of liquid is permitted in one direction or the other through the conduit $c$, the frictional resistance to the flow of the liquid being reduced to the minimum by the described form and arrangement of the chamber $d$ and conduits $g$ and $h$.

In Fig. 3 I show in addition to the parts above described a conduit $c'$, communicating with the upper portion of the tank $a$, a chamber $d'$, communicating with the conduit $c'$, and conduits $g'$ and $h'$, communicating, respectively, with the upper and lower ends of the chamber $d'$, the chamber $d'$ having a valve $i'$, which is connected with the valve $i$ by means hereinafter described. The parts $c'$, $d'$, $i'$, $g'$, and $h'$ have the same relative arrangement and are adapted to coöperate in the same manner as the parts $c$, $d$, $g$, $h$, and $i$, the arrangement being such that when the valves $i$ and $i'$, which are adjusted simultaneously, are in the position shown in Fig. 3 the unfiltered supply of liquid can enter the tank through the conduit $g'$, the lower portion of the chamber $d'$, and the conduit $c'$, the filtered water passing from the tank through the conduit $c$, the lower portion of the chamber $d$, and the conduit $g$. When the valves are adjusted to their lowest position, the wash-supply enters the tank through the conduit $h$, the upper portion of the chamber $d$, and the conduit $c$, and the wash-discharge, containing the sediment removed from the filter-bed, escapes through the conduit $c'$, the upper portion of the chamber $d'$, and the conduit $h'$. When the valves are in their intermediate position, all the ports are closed and no liquid can flow through the conduits $c$ and $c'$, the tank being thus put out of commission. The stem $j'$ of the valve $i'$ is coupled to the stem $j$ of the valve $i$, the coupling being preferably an adjusting-nut $p$, which has a right and a left hand thread, one engaged with a corresponding thread on the stem $j$ and the other with a corresponding thread on the stem $j'$, so that by rotating the nut the valves may be adjusted toward and from each other to a limited extent to cause them to coöperate accurately with the ports in the chambers $d$ and $d'$. A stop-collar $q$ is affixed to the stem $j$ and is arranged to strike the stuffing-box $k$ when the valves are adjusted to the lower extreme of their movement, so that the operator is prevented from moving the valves too far downwardly. The stop may also coöperate with the bracket $n$ in limiting the upward movement of the valves.

It will be seen that the structure shown in Fig. 3 enables the flow of the unfiltered supply to the tank, the flow of the filtered liquid to its reservoir, the flow of the wash-supply to the tank, and the flow of the wash-discharge from the tank to be controlled by a single operating or adjusting device, such as the nut $m$ and its hand-wheel $o$. This control is new so far as I am aware.

When the structure shown in Fig. 1 is employed, the wash-discharge may escape from the tank through a suitable waste-outlet or it may simply flow over the top of the tank.

In practice there will usually be a plurality of tanks $a$, all communicating with the same source of supply of unfiltered water and with the same reservoir for filtered water.

It is evident that the wash-discharge conduit $h'$ and the unfiltered-supply conduit $g'$ may be transposed and the upper valve $i'$ arranged to lie below the ports of the chamber $d'$, when the valve $i$ is above the ports of the chamber $d$, the adjusting-nut $m$ being threaded right and left hand and causing the valves to move in opposite directions and cover and open the ports simultaneously. This method would have the advantage of making the valves $i$ and $i'$ the equivalent of a balanced valve during the filtering operation.

I claim—

1. In a water-filter, the combination of a filter-casing, a cylindrical chamber having centrally-arranged ports communicating with the filter-casing, conduits constituting extensions of said chamber at opposite sides of the ports, a valve movable in said chamber and adapted to be adjusted to either of two end positions and thereby cut off either conduit from the ports, allowing the other conduit to communicate with the ports and to be adjusted to an intermediate position and shut off both conduits from the ports, and means for adjusting said valve and holding it in any position to which it may be adjusted.

2. In a water-filter, the combination of a filter-casing, a cylindrical chamber having centrally-arranged ports communicating with the filter-casing, conduits constituting extensions of said chamber at opposite sides of the ports, a valve movable in said chamber and adapted to be adjusted to either of two end positions and thereby cut off either conduit from the ports, allowing the other conduit to communicate with the ports, and to be adjusted to an intermediate position and shut off both conduits from the ports, a screw-threaded rod connected with the valve, and an adjusting-nut journaled in a fixed support and engaged with said rod.

3. In a water-filter, the combination of a filter-casing, two cylindrical chambers one above the other, each having centrally-arranged ports, the ports of one chamber communicating with the upper portion of the casing, while those of the other chamber communicate with the lower portion of the casing, each chamber having two conduits constituting extensions of the chamber, valves movable in said chambers and each adapted to be adjusted to two end positions and to an intermediate position for the purpose specified, and means for simultaneously adjusting said valves.

4. In a water-filter, the combination of a filter-casing, two cylindrical chambers one above the other, each having centrally-arranged ports, the ports of one chamber communicating with the upper portion of the casing, while those of the other chamber communicate with the lower portion of the casing, each chamber having two conduits constituting extensions of the chamber, valves movable in said chambers and each adapted to be adjusted to two end positions and to an intermediate position for the purpose specified, a screw-threaded rod connecting said valves, and an adjusting-nut journaled in a fixed support and engaged with said rod whereby the valves may be simultaneously adjusted.

5. In a water-filter, the combination of a filter-casing, a cylindrical chamber having centrally-arranged ports communicating with the filter-casing, conduits constituting extensions of said chamber at opposite sides of the ports, a valve movable in said chamber and adapted to be adjusted to either of two end positions and thereby cut off either conduit from the ports, allowing the other conduit to communicate with the ports, and to be adjusted to an intermediate position and shut off both conduits from the ports, a screw-threaded rod connected with the valve, an adjusting-nut journaled in a fixed support and engaged with said rod, a stop member on said rod, and one or more fixed stop members cooperating therewith, substantially as described.

6. In a water-filter, the combination of a filter-casing, two cylindrical chambers one above the other, each having centrally-arranged ports, the ports of one chamber communicating with the upper portion of the casing while those of the other chamber communicate with the lower portion of the casing, each chamber having two conduits constituting extensions of the chamber, valves movable in said chambers and each adapted to be adjusted to two end positions and to an intermediate position for the purpose specified, a screw-threaded rod connecting said valves, and adapted to be lengthened and shortened to vary the distance between the valves, and an adjusting-nut journaled in a fixed support and engaged with said rod whereby the valves may be simultaneously adjusted.

In testimony whereof I have affixed my signature in presence of two witnesses.

CHARLES E. TORRANCE.

Witnesses:
H. L. FULLER,
F. E. MAIN.